United States Patent
Sergeev et al.

(10) Patent No.: US 12,104,920 B2
(45) Date of Patent: Oct. 1, 2024

(54) SEMANTIC MAP WITH LIVE UPDATES

(71) Applicant: GM Cruise Holdings LLC, San Francisco, CA (US)

(72) Inventors: Roman Sergeev, New York, NY (US); Andrew Robinson, San Francisco, CA (US); Lucio Otavio Marchioro Rech, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/478,924

(22) Filed: Sep. 29, 2023

(65) Prior Publication Data

US 2024/0027222 A1 Jan. 25, 2024

Related U.S. Application Data

(63) Continuation of application No. 17/550,471, filed on Dec. 14, 2021, now Pat. No. 11,808,600, which is a
(Continued)

(51) Int. Cl.
*G01C 21/00* (2006.01)
*G01C 21/02* (2006.01)
*G01C 21/20* (2006.01)
*G01C 21/36* (2006.01)
*G05D 1/00* (2006.01)
(Continued)

(52) U.S. Cl.
CPC ......... *G01C 21/3804* (2020.08); *G01C 21/02* (2013.01); *G01C 21/20* (2013.01); *G01C 21/3602* (2013.01); *G01C 21/387* (2020.08); *G01C 21/3889* (2020.08); *G05D 1/0274* (2013.01); *G06F 16/29* (2019.01); *G06V 20/588* (2022.01)

(58) Field of Classification Search
CPC .............. G01C 21/3859; G01C 21/387; G01C 21/3881; G01C 21/005; G01C 21/3804
See application file for complete search history.

(56) References Cited

U.S. PATENT DOCUMENTS 9,665,100 B2 5/2017 Shashua et al.
10,935,385 B2 3/2021 Ohyama et al.
(Continued)

OTHER PUBLICATIONS

Davison, John A., "Mobile Robot Navigation Using Active Vision", Robotics Research Group Department of Engineering Science, University of Oxford, Feb. 14, 1998, 153 pages.

*Primary Examiner* — Kenneth J Malkowski

(57) ABSTRACT

Systems, methods, and devices are disclosed for synchronizing map updates for a navigating autonomous vehicle. A management service on a managing node can receive an update to a portion of a first map, where a limited visibility map, which is a subset of the first map, can be determined based on a geographical area around an autonomous vehicle navigating a route. The limited visibility map can be synchronized among all the nodes while the autonomous vehicle is using the limited visibility map by the management service delivering, to a plurality of downstream nodes, the update to the limited visibility map when the update does not modify a portion of the limited visibility map, and by bypassing, to the plurality of downstream nodes, the update to the limited visibility map when the update modifies a portion of the limited visibility map.

17 Claims, 6 Drawing Sheets

Related U.S. Application Data continuation of application No. 16/718,879, filed on Dec. 18, 2019, now Pat. No. 11,226,207.

(51) Int. Cl.
  *G06F 16/29* (2019.01)
  *G06V 20/56* (2022.01)

(56) References Cited

U.S. PATENT DOCUMENTS

| | | |
|---|---|---|
| 2007/0093960 A1 | 4/2007 | Atarashi |
| 2017/0122749 A1 | 5/2017 | Urano et al. |
| 2017/0337813 A1 | 11/2017 | Taylor |
| 2018/0189323 A1* | 7/2018 | Wheeler ............ G01C 21/3881 |
| 2019/0137287 A1 | 5/2019 | Pazhayampallil et al. |
| 2020/0296558 A1 | 9/2020 | Adare et al. |

* cited by examiner

SEMANTIC MAP WITH LIVE UPDATES

CROSS-REFERENCE TO RELATED APPLICATIONS

This application is a continuation of U.S. application Ser. No. 17/550,471, filed on Dec. 14, 2021, entitled SEMANTIC MAP WITH LIVE UPDATES, which is a continuation of and claims the benefit of U.S. application Ser. No. 16/718,879, filed on Dec. 18, 2019, now U.S. Pat. No. 11,226,207, entitled, SEMANTIC MAP WITH LIVE UPDATES, all of which are expressly incorporated by reference in their entireties.

TECHNICAL FIELD

The present technology pertains to updating a portion of a map, and more specifically pertains to synchronizing map updates for a navigating autonomous vehicle.

BACKGROUND

An autonomous vehicle (AV) is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When an autonomous vehicle navigates a route, the autonomous vehicle uses a map in conjunction with its sensor systems to orient itself and provide a direction in which to drive towards. The autonomous vehicle accesses the map in the autonomous vehicle (AV) stack. However, the road system and/or road conditions change over time, sometimes suddenly, and the autonomous vehicle needs a service that can support dynamic map updates. In addition, a full map can be quite large (encompassing an entire area of interest, such as a city), which presents problems with bandwidth and update speed. What is needed is a system that supports real time or near real time updates with the average time for an update to be applied to an autonomous vehicle being within a short amount of time (e.g., on the order of seconds or smaller) of publishing.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
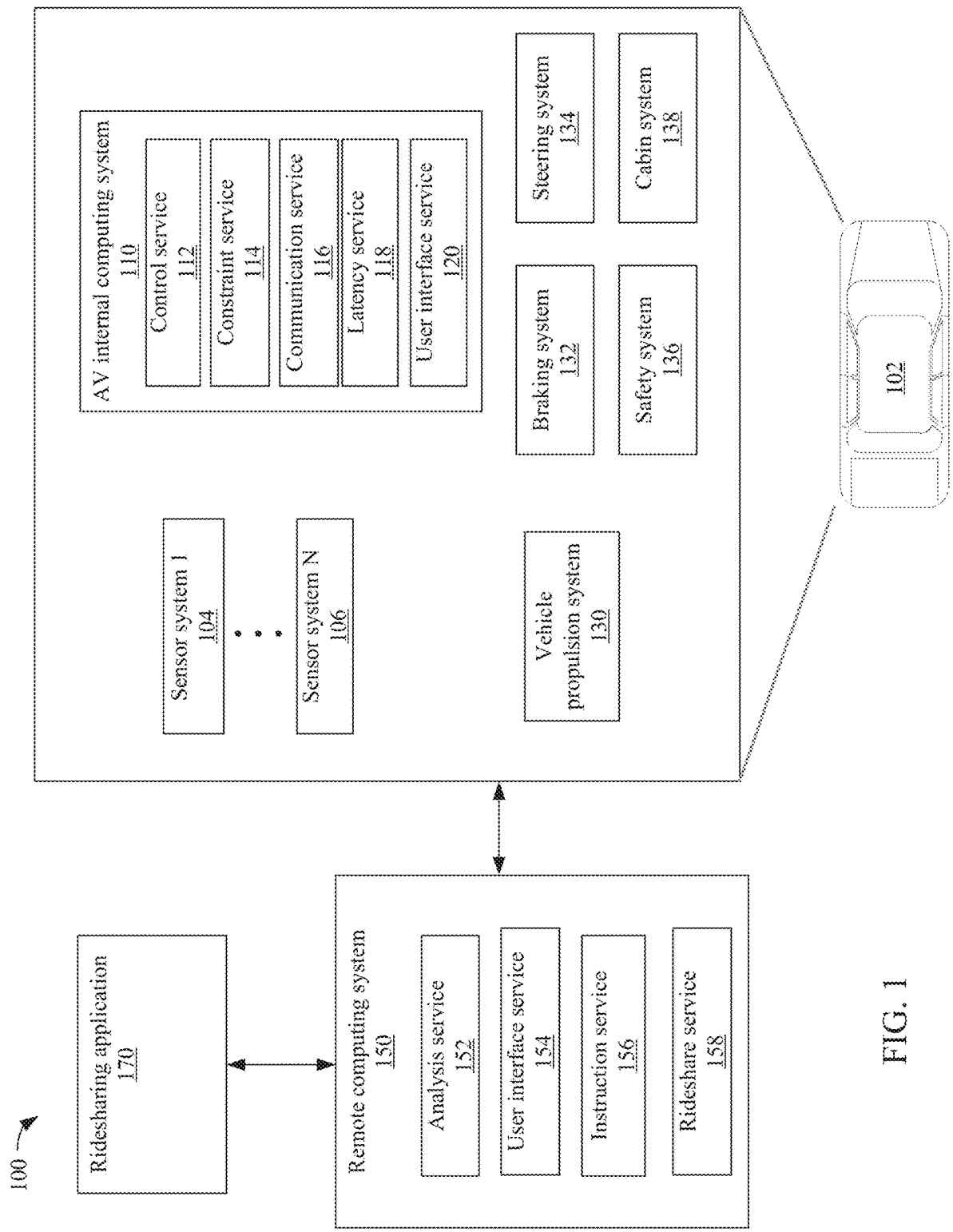
FIG. 1 illustrates an example schematic diagram of an autonomous vehicle and network environment, in accordance with some embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for updating individual parts of a map in such a way that the autonomous vehicle can use the updates on the existing map that it is currently operating on. For example, when a certain release of the map is made, the map is immutable. If the map needs to be updated, the full map needs to be released and synchronized to any downstream nodes. However, this can cause issues when an autonomous vehicle is currently using the map to navigate, since receiving the full map takes too long to download, requires too much compute resources, etc. An update may be delayed between one or more downstream nodes that relate to multiple systems within the autonomous vehicle's technology (e.g., sensor suites, navigational services, etc.) that need to work together in order to operate effectively. This can cause undefined data inputs/outputs due to confusion in map versions.

A solution to the above problems can involve systems and methods by which the downstream nodes on the autonomous vehicle are granted access to a limited area of the map instead of the full map. For example, the visibility to the limited area of the map can be concentrated around a certain area of the navigating autonomous vehicle, and can be moved as the autonomous vehicles moves in order to maintain the same area of visibility. Any map updates to the full map version cannot be applied to the limited area of the map if there is an inconsistency between the previous version and the updated version. This ensures that maps can be updated without version confusion and ensures that the autonomous vehicle avoids undefined data inputs/outputs while it is navigating.

Accordingly, systems, methods, and devices are disclosed for synchronizing map updates for a navigating autonomous vehicle. In some embodiments, a management service on a managing node can receive an update to a portion of a first map (e.g., a full map, or a map larger than desired for synchronization between the downstream nodes). The management service can determine a limited visibility map, which is a subset of the first map, based on a geographical area around an autonomous vehicle navigating a route. The limited visibility map can be synchronized among all the nodes while the autonomous vehicle is using the limited visibility map by the management service delivering, to a plurality of downstream nodes, the update to the limited visibility map when the update does not modify a portion of the limited visibility map, and by bypassing, to the plurality of downstream nodes, the update to the limited visibility map when the update modifies a portion of the limited visibility map.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
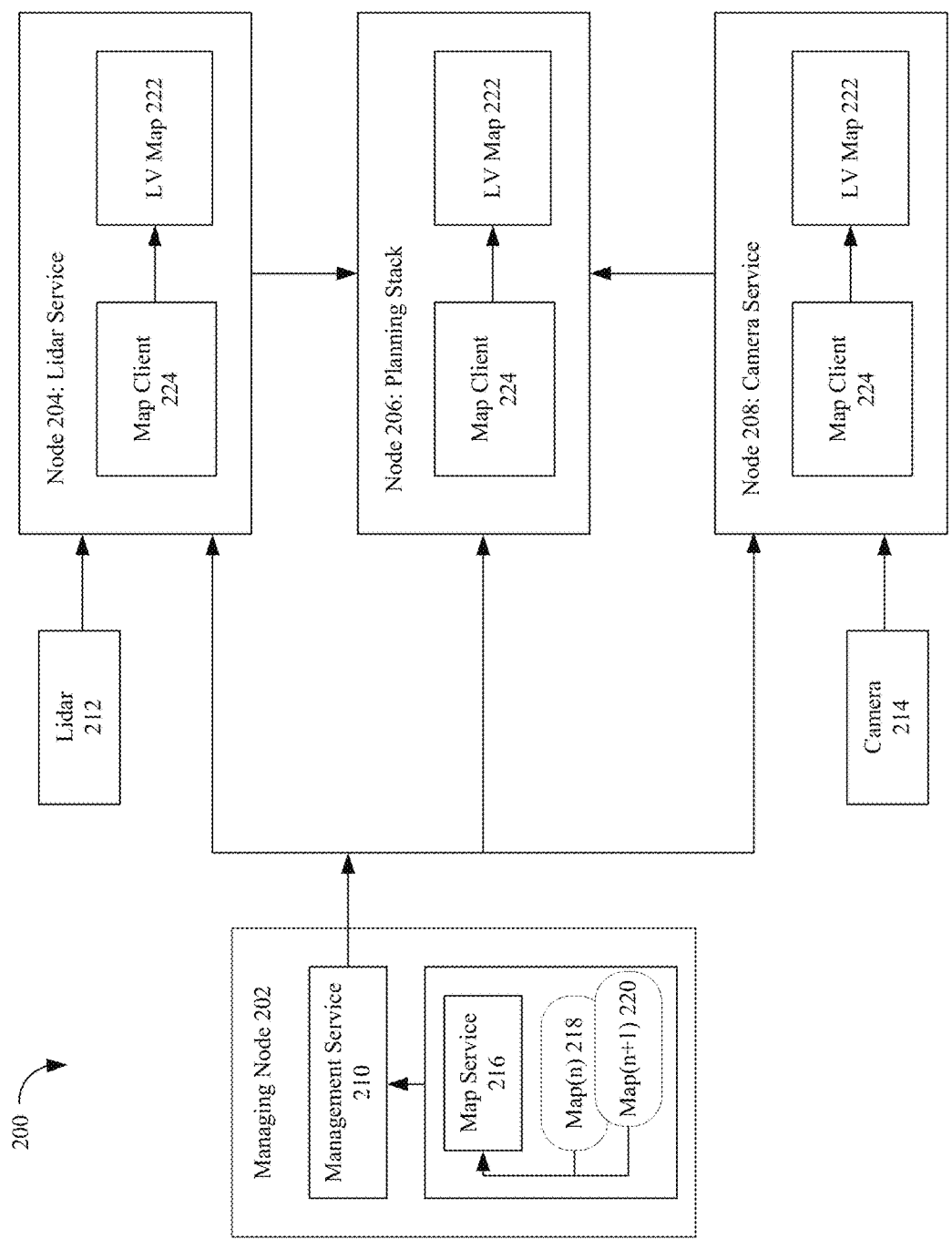
FIG. 2 shows an example system for synchronizing map updates to a limited visibility map for a navigating autonomous vehicle in accordance with some aspects of the present technology.

FIG. 2 shows an example system for synchronizing map updates to a limited visibility map for a navigating autonomous vehicle in accordance with some aspects of the present technology. In some embodiments, the autonomous vehicle can navigate about roadways without a human driver based upon sensor signals output by sensor systems and maps of the route and/or surrounding area. The map can be a semantic map that can include a feature rich vector map of the world. For example, the features included within the semantic map can be related to lines (e.g., lanes, lane boundaries), polygonal shapes that correspond to certain areas (e.g., drivable vs. undrivable areas), traffic signs, etc. that matter or are related to the autonomous vehicle navigating a road. The semantic map can include the geometries of the features and/or their characteristics. In some embodiments, these features can be represented in the semantic map like an analytic object, which can be stored in the form of a graph. The semantic map can be made up of multiple types of analytic objects and relationships between them, by creating a map based on a graph connected to another graph (e.g., a multilayer graph). This allows the map to easily scale up to include any number of relevant features, which can be added or removed based on which features are needed within the semantic map.

However, when a certain release of the map is made, the map, without more, is immutable. Over time, the map may need to change based on road changes, condition changes, the addition or removal of traffic signs and intersections, etc. It would be advantageous to update individual parts of the map without releasing the full map in order to save compute resources, speed, latency, and/or bandwidth. In order to provide updated maps, the autonomous vehicle technology (sensors and routing/navigation services, for example, could use new updates to the individual parts of the map that the autonomous vehicle technology is currently operating on instead of being forced to download the entire full map.

These updated maps can be synchronized between multiple downstream nodes without halting an autonomous vehicle's navigation by enabling a managing node (e.g., a router or other device) have access to a full version of the map, but only forward a limited-visibility portion of the map to the downstream nodes. To do this, any map updates to the full map version cannot be applied to the limited-visibility portion of the map if there is an inconsistency between them—if so, the update can be delayed to another time. This is to keep the navigation from hitting undefined data inputs/outputs due to confusion in different map versions.

System 200, for example, shows managing node 202 in communication with various downstream nodes, such as node 204, node 206, and node 208. Managing node 202 can be a management service that orchestrates how and when updates to the map are published to downstream nodes 204, 206, and/or 208. Managing node 202 can be, for example, a router or other similar device that, through its management service 210, can deliver maps, such as limited visibility maps 222 (discussed in more detail in FIGS. 4A-4B), to downstream nodes 204, 206, and/or 208.

In some embodiments, downstream nodes 204, 206, and/or 208 can be independent processes related to autonomous vehicle navigation. The downstream nodes 204, 206, and/or 208 can be services or sensor systems similar to sensor systems 104-106 and/or AV internal computing system 110 of the autonomous vehicle 102 in FIG. 1. For example, as shown in FIG. 2, the downstream nodes can be a lidar service (e.g., node 204), which can produce high-resolution digital representations of an autonomous vehicle's environment by detecting and measuring reflected laser light with one or more lidar sensors 212. Another example of a downstream node can be a camera service (e.g., node 208), which can image an autonomous vehicle's environment through one or more cameras 214. Any number of sensors and/or processes can be a downstream node included within system 200.

In some embodiments, the independent processes can communicate with each other while the autonomous vehicle navigates the route. For example, one or more of the downstream nodes can receive output from other nodes in order to carry out certain functions for the autonomous vehicle, such as planning stack (node 206). Planning stack (node 206), for example, can plan routes for the autonomous vehicle, affect autonomous vehicle movement, etc. based on the output from lidar service (node 204) and camera service (node 208). These types of nodes can be especially reliant on the input nodes (e.g., nodes 204, 208) outputting data with consistent map versions. If a map version is inconsistent between lidar service node 204 and camera service node 208, for example, then navigation can be undefined for one or more map areas that have changed between the different map versions and navigation can be halted.

For example, multi-node systems, such as system 200, can run into fundamental problems related to data consistency. The nodes within system 200 can run asynchronously. While some of the nodes can be grouped in synchronized clusters in some embodiments, there is no established synchronization among all nodes. This can lead to scenarios where nodes can execute their logic based on different outputs generated by the same node.

For example, at a first time, managing node 202 may send a version A of a map to node 204, and then send version A of the map to node 206. At a subsequent time, managing node 202 may send an updated version—version B of the map—to node 206. Before managing node 202 can send version B of the map to node 204, however, node 204 can send data to node 206 based on version A of the map. Node 206 then receives inconsistent inputs from node 204 and managing node 202, making the outcome undefined. This inconsistency increases with larger numbers of nodes, since node desynchronization between map versions increases as the number of nodes increases. Therefore, due to the lack of instantaneous synchronization between all nodes within system 200, the solution of full independence between the maps and the guarantee that only one version of the map is used across the whole system 200 is not achievable. The disclosed solution, then, is to guarantee that data within an intersection region of two limited visibility maps are identical for at least two consecutive frames.

Figure 3:
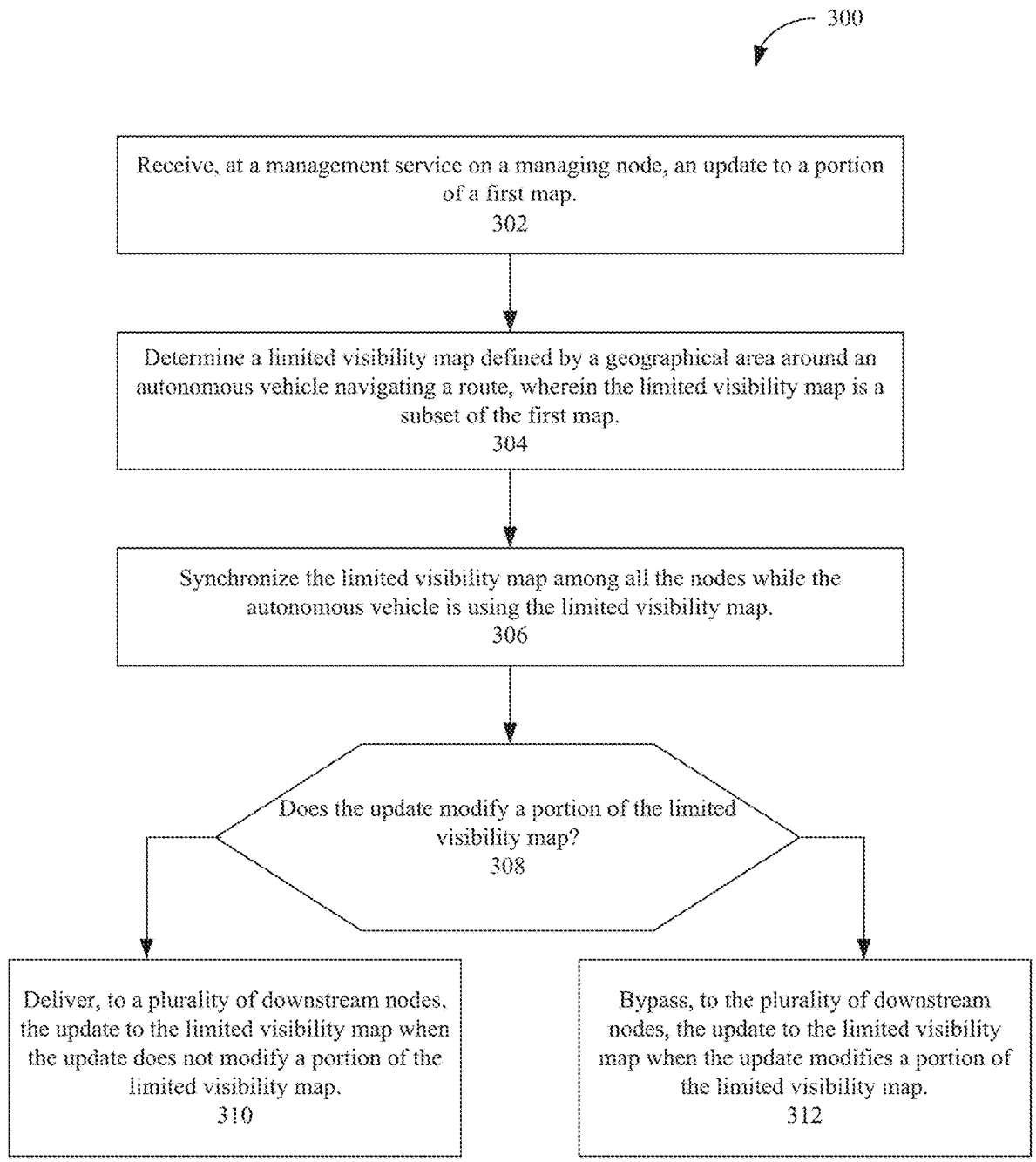
FIG. 3 shows an example method for synchronizing map updates for a navigating autonomous vehicle in accordance with some aspects of the present technology.

FIG. 3 shows just such an example method for synchronizing map updates for a navigating autonomous vehicle in accordance with some aspects of the present technology. In some embodiments, the map update process can begin when management service 210 on managing node 202 can receive (302) an update to at least a portion of the full map. Management node 202 can in some embodiments be a router in order to simplify and minimize synchronization between two or more nodes that need updates to the map, without sending to the nodes the full version of the map during map updates.

For example, in system 200, managing node 202 can include map service 216 that can generate limited visibility maps and perform map updates. In some embodiments, map service 216 can be designed to be a standalone component integrated into managing node 202. For example, map service 216 can be integrated into the router to simplify synchronization between the map service 216 and management service 210 during a map update. In other embodiments, map service 216 can be a component in communication with management service 210 and/or managing node 202.

In some embodiments, map service 216 can queue any received updates, such as map(n) 218 and a subsequent map version, map(n+1) 220. Each update can be associated with a certain version of the full map containing updates to the previous full map. These map versions can be stored within the queue until the downstream nodes are ready to receive them.

To minimize synchronization between two or more nodes that need updates to the map, without sending to the nodes the full version of the map during map updates, map service 216 can determine (304) a limited visibility map (LV map) 222 defined by a geographical area around the autonomous vehicle while it is navigating a route.

Once the LV map 222 is defined, the management service 210 can send the LV map 222 to the downstream nodes. For example, on each downstream node, the node can include map client 224 that can receive the current version of LV map 222 from the management service 210 and act as a synchronization and bookkeeping mechanism for that node. For example map client 224 can have functionality that can integrate LV map 222 with the node's functionality. In the example shown, map client 224 on node 208 can integrate camera 214 functionality with LV map 222 (e.g., ensure that camera 214 is operating on the map version of LV map 222 consistent across nodes 204 and 206), and/or map client 224 on node 204 can integrate lidar 212 functionality with LV map 222 (e.g., ensure that lidar 212 is operating on the map version of LV map 222 consistent across nodes 208 and 206).

Figure 4A:
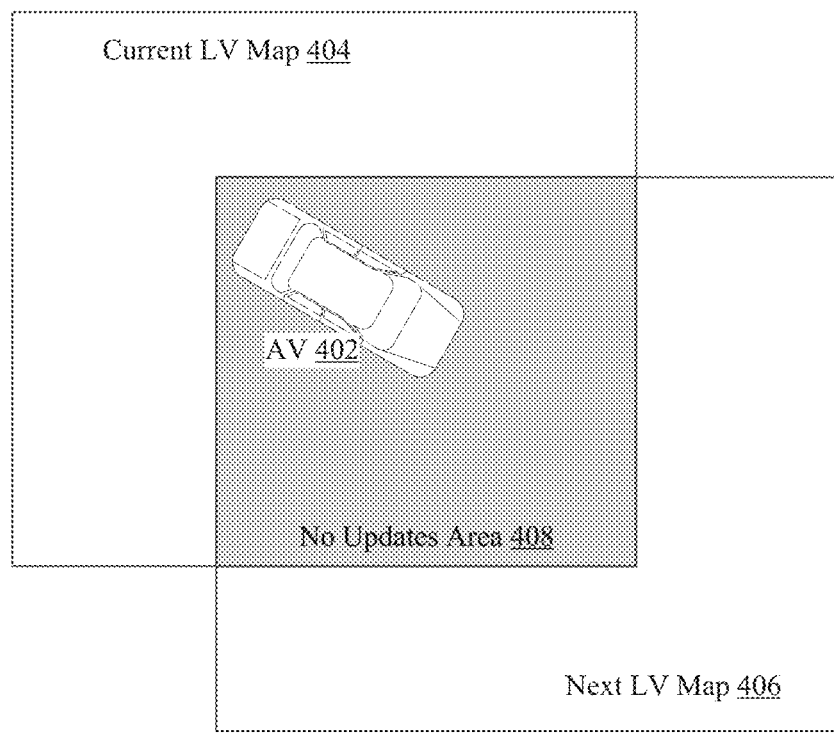
FIG. 4A shows an example visualization of limited visibility maps and update areas for a navigating autonomous vehicle in accordance with some aspects of the present technology.

The LV map 222 itself can be a subset of the full map. In some embodiments, LV map 222 can be a semantic map initialized from data within the limited geographic area that defines it, so that it includes the full feature richness of the semantic map. FIG. 4A shows an example visualization of LV maps 222 and associated update areas for a navigating autonomous vehicle in accordance with some aspects of the present technology.

In FIG. 4A, autonomous vehicle 402 is navigating along a route (although this process can work when the autonomous vehicle 402 is stationary and/or on startup). A current location of the autonomous vehicle and a future location of the autonomous vehicle 402 can be determined in order to generate a current LV map 404. For example, map service 216 on managing node 202 can receive autonomous vehicle's 402 location (e.g., GPS or other suitable location data) to define a geographic area around the autonomous vehicle's 402 location that represents a fixed area within the full map. This fixed area can be a subset of raw map data that the map service 216 can then overlay with semantic information from the full map. This can create current LV map 404 with the feature richness of the full map, but limited to the smaller area around the autonomous vehicle's 402 current location. In some embodiments, current LV map 404 can be required to comply with the same validity checks as the full version of the map, and can be synchronized among downstream nodes (e.g., nodes 204, 206, 208) in a communication protocol between management service and map client 224.

Downstream nodes receiving inputs computed on different versions of LV maps 222 will need to discard data that are out of current LV map 404. However, if the queryable radius is within the geographic area, there should not be a case when downstream nodes (e.g., planning stack node 206) receive inputs from other downstream nodes (e.g., lidar service node 204 and/or camera service node 208) with map data that is out of the current LV map 404 range.

The visibility range of current LV map 404 can be maintained as long as autonomous vehicle 402 moves. As autonomous vehicle 42 moves towards the edge of current LV map 404, a new section of the map can be created in order to maintain the same or similar area of visibility (e.g., the next LV map 406). The next LV map 406 can be the area around a future location of the autonomous vehicle 402, based on its direction of travel, known route direction, etc. In this way, the downstream nodes can continuously operate on an LV map covering the relevant geographical area, since as the autonomous vehicle 402 moves out of the current LV map 404 range, the next LV map 406 can be applied.

Synchronization (306) among the downstream nodes while the autonomous vehicle 402 is navigating and/or using the current LV map 404 can be accomplished by making sure the map version of the current LV map 404 is consistent among the nodes, and only allowing an update to the map when the update will not affect navigation. To do so, map service 216 can define a no updates area 408 that determines whether an update will be applied to the current LV map 404 and/or the next LV map 406.

The no updates area 408 can require 1:1 data equality between two map versions around the navigating autonomous vehicle 402 and an area of future or projected travel of the autonomous vehicle 402. In some embodiments, the no updates area 408 can be a subset of/smaller area than current LV map 404 and/or next LV map 406. In other embodiments, the no updates area 408 can span the entire area of the current LV map 404 and/or next LV map 406.

When updating the map, map service 216 on managing node 202 can receive a generic signal that a portion of the full map needs to be updated. This portion can apply to anywhere within the full map. To make sure the update doesn't affect the autonomous vehicle's 402 navigation, when a map update is received by map service 216, map service 216 can determine (308) if the update modifies the no updates area 408 within (or, in some embodiments, encompassing) the current LV map 404. If not, then map service 216 can deliver (310), to the downstream nodes 204, 206, 208, the updated LV map (e.g., LV map 222). However, if the update does modify the no updates area 408 within (or, in some embodiments, encompassing) the current LV map 404, then map service 216 can bypass (312) delivering the updated LV map (e.g., LV map 222) to the downstream nodes 204, 206, 208. Instead, in some embodiments, map service 216 can store the update within managing node 202 (e.g., map(n) 218 and/or map(n+1) 220). This means that planning stack node 206 cannot perform a map update if a new version of the map is inconsistent with the previous map in the no updates area 408.

Figure 4B:
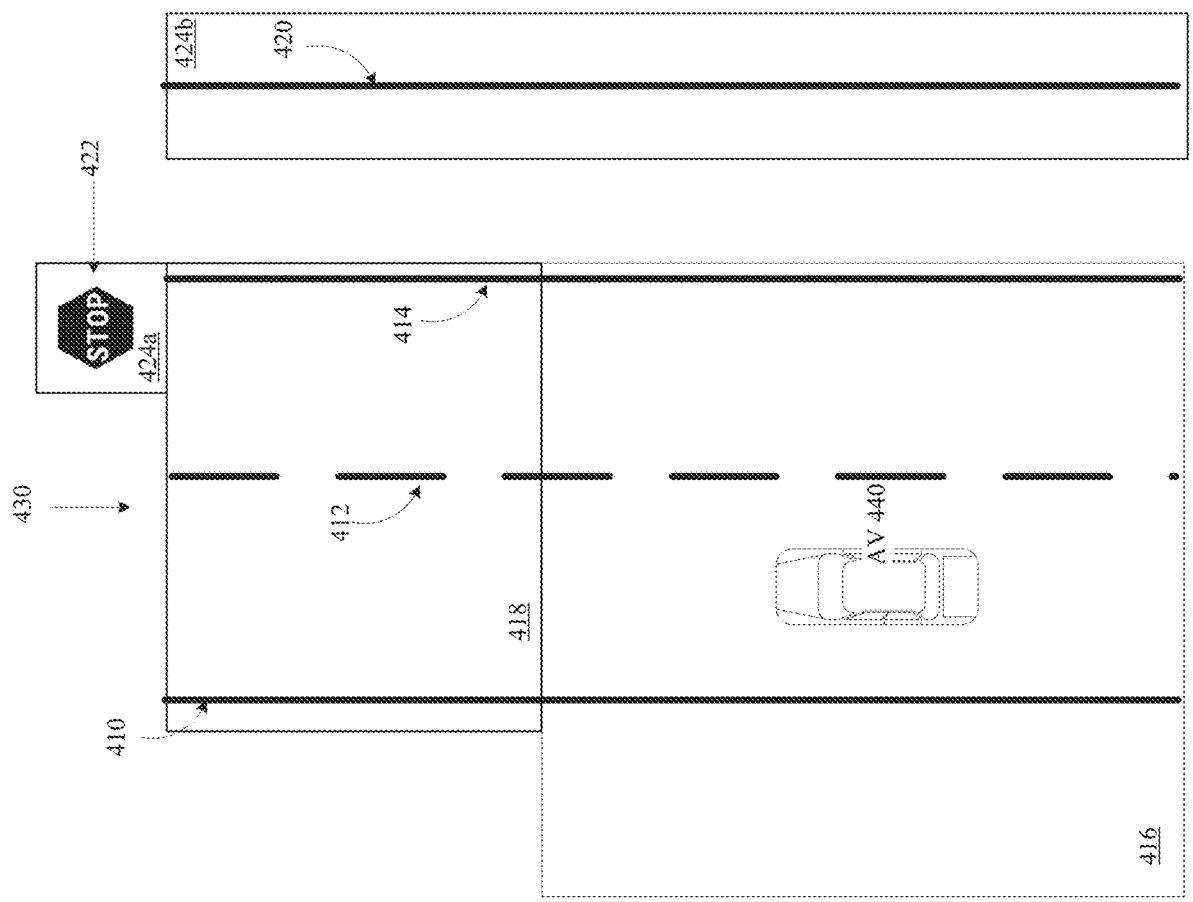
FIG. 4B shows an example visualization of semantic features extending limited visibility maps for a navigating autonomous vehicle in accordance with some aspects of the present technology.

In some embodiments, the area of an LV map is not standard. Because the LV map can contain features within the semantic map that extend outside of a standardized geographical area. FIG. 4B shows an example visualization of semantic features extending LV maps for a navigating autonomous vehicle in accordance with some aspects of the present technology.

In FIG. 4B, autonomous vehicle 440 is navigating down road 430. Road 430 contains multiple sematic features, such as lane boundary 410, passing lane boundary 412, and lane boundary 414. The LV map may start with default bounding box 416, which extends over a default, minimal geographical area. Map service 216 can, for example, determine the default bounding box 416 to be a subset of raw full map data that represents a predefined fixed area around the position of autonomous vehicle 440.

However, one or more semantic features can be included within default bounding box 416, and in order for the autonomous vehicle 440 to navigate, the LV map the autonomous vehicle 440 relies upon must be expanded to include relevant portions of the semantic feature(s). In this case, default bounding box 416 can be extended to include lane boundary 410, passing lane boundary 412, and lane boundary 414 within extended bounding box 418.

Extended bounding box 418 can be defined by expanding the subset of raw full map data outside the predefined fixed area to include map data encompassing the semantic feature(s). The semantic features can include lanes, lane boundaries, drivable and undrivable areas, etc. This would mean that the LV map would include at least both default bounding box 416 and extended bounding box 418.

In some embodiments, there can be multiple types of data provided by the semantic map, such as lines (such as lanes, lane boundaries), polygons (drivable/undrivable areas), and relationships between multiple semantic features. For example, semantic features can be data related to lanes (major lanes, minor lanes, super lanes), cross traffic, crosswalk lanes (drivable and undrivable areas), buffered crosswalk areas, driveway entries, intersections, invalid lanes (missing data/pixels, sharp turns, too narrow), lane boundaries (drivable areas and undrivable areas), lane connections, lane connection blinker, lane intersections (drivable areas and undrivable areas), lane yield areas, routable areas (inside a routable area and outside the routable area), traffic lights, traffic light to lane areas, traffic signs, traffic sign to lane areas, etc.

For example, the semantic map can provide an API to fetch map data from the full map for specified regions, such as the geographical regions defining an LV map. This mechanism can be used to fetch primary semantic feature types, (e.g., lane and drivable areas) which can represent the beginnings of the LV map.

In some embodiments, the subset of raw full map data can be extended to include additional semantic features that may be entirely outside the fixed area. For example, even though the additional sematic feature is outside default bounding box 416, the additional semantic feature may be connected to a semantic feature within default bounding box 416 based on a relationship between the sematic feature and the additional semantic feature. In the example embodiment shown, sematic features bike lane 420 and stop light 422 are outside default bounding box 416, but have a relationship to the lane bounded by lane boundary 414 and/or passing lane boundary 412. Stop light 422 within additional bounding box 424a is a semantic feature that alerts the autonomous vehicle 440 of the need to stop in case of cross traffic from bike lane 420 within additional bounding box 424b. In other words, stop light 422 and/or bike lane 420 are dependencies that are connected with and rely on the semantic features within default bounding box 416 (e.g., lane boundary 314 and/or passing lane boundary 412), which needs stop light 422 and/or bike lane 420 in order to make sense of all relevant aspects of the LV map within default bounding box 416. Thus, the LV map can extend to include additional bounding box 424a and additional bounding box 424b along with default bounding box 416 and extended bounding box 418.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 5:
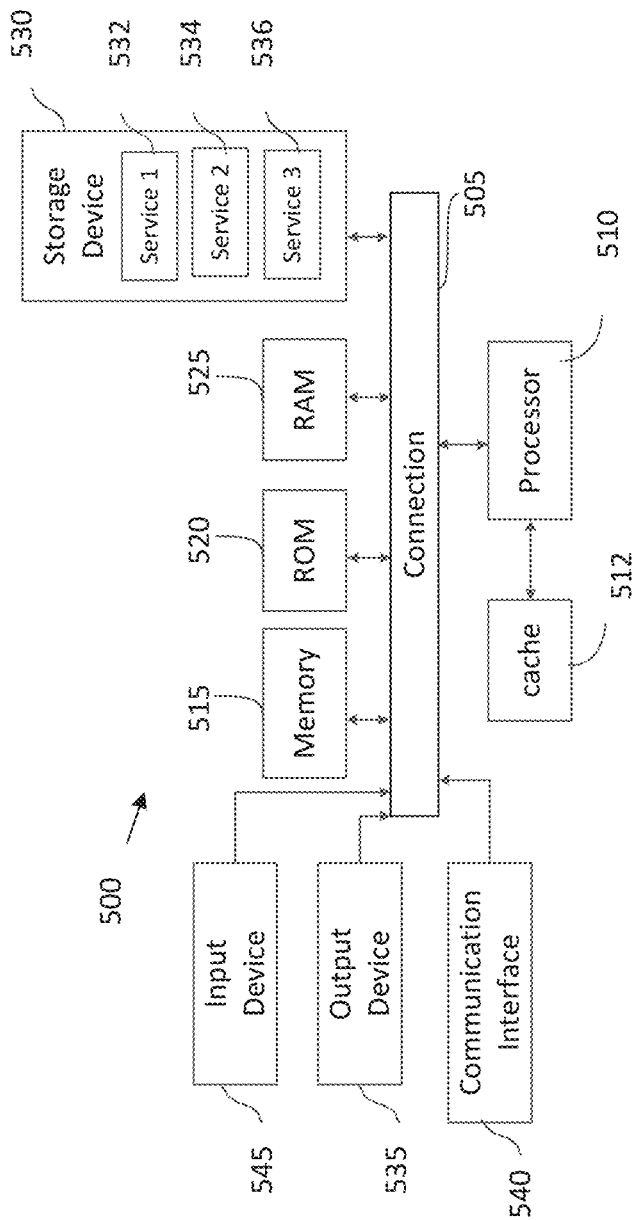
FIG. 5 shows an example of a system for implementing certain aspects of the present technology.

FIG. 5 shows an example of computing system 500, which can be for example any computing device making up internal computing system 110, remote computing system 150, (potential) passenger device executing rideshare app 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving an update to a map used by an autonomous vehicle (AV), the map including raw map data overlaid with semantic map features;
   determining an inconsistent portion of the update, the inconsistent portion of the update being inconsistent with a portion of the map;
   determining a current limited visibility map defining a first geographical area within a predetermined distance from a body of the AV as the AV is navigating a route, the current limited visibility map being a subset of the map and including a subset of the semantic map features;
   identifying a semantic map feature of the subset of semantic map features that extends outside of the first geographical area, the semantic map feature having a boundary area;

expanding the first geographical area defined in the current limited visibility map to include the boundary area of the identified semantic map feature;
determining the inconsistent portion of the update is within the boundary area of the expanded first geographical area defined in the current limited visibility map;
applying a next limited visibility map, defining a second geographical area, as the AV moves out of expanded first geographical area defined in the current limited visibility map;
determining that the inconsistent portion of the update is outside of the second geographical area defined in the next limited visibility map;
in response to determining that the inconsistent portion of the update is outside the second geographical area, applying the inconsistent portion of the update to the map.

2. The computer-implemented method of claim 1, further comprising:
determining one or more processes of the AV are utilizing the current limited visibility map; and
determining the one or more processors of the AV have ceased utilizing the current limited visibility map, wherein the applying the inconsistent portion of the update to the map is in response to both the determining that the inconsistent portion of the update is outside of the second geographical area defined in the next limited visibility map and the determining the one or more processes of the AV have ceased utilizing the current limited visibility map.

3. The computer-implemented method of claim 2, wherein the one or more processes are associated with a sensors service and a navigation service.

4. The computer-implemented method of claim 1, further comprising:
receiving a plurality of updates, including the update to the map, wherein each of the plurality of updates is associated with a particular version of the map; and
queuing the plurality of updates.

5. The computer-implemented method of claim 1, wherein the current limited visibility map includes
a subset of the raw map data having lidar sensor data representing an environment of the first geographical area.

6. The computer-implemented method of claim 5, wherein expanding the first geographical area defined in the current limited visibility map further includes:
extending the subset of raw map data to include at least a portion of the raw map data that represents the boundary area associated with the semantic map feature that extends outside of the first geographical area, and the semantic map feature comprises at least one of a lane, a lane boundary, or drivable or undrivable areas.

7. A tangible, non-transitory computer readable medium storing instructions that, when executed by at least one processor, cause the at least one processor to perform operations comprising:
receiving an update to a map used by an autonomous vehicle (AV), the map including raw map data overlaid with semantic map features;
determining an inconsistent portion of the update, the inconsistent portion of the update being inconsistent with a portion of the map;
determining a current limited visibility map defining a first geographical area within a predetermined distance from a body of the AV as the AV is navigating a route, the current limited visibility map being a subset of the map and including a subset of the semantic map features;
identifying a semantic map feature of the subset of semantic map features that extends outside of the first geographical area, the semantic map feature having a boundary area;
expanding the first geographical area defined in the current limited visibility map to include the boundary area of the identified semantic map feature;
determining the inconsistent portion of the update is within the boundary area of the expanded first geographical area defined in the current limited visibility map;
applying a next limited visibility map, defining a second geographical area, as the AV moves out of expanded first geographical area defined in the current limited visibility map;
determining that the inconsistent portion of the update is outside of the second geographical area defined in the next limited visibility map;
in response to determining that the inconsistent portion of the update is outside the second geographical area, applying the inconsistent portion of the update to the map.

8. The tangible, non-transitory computer readable medium of claim 7, wherein the at least one processor performs operations further comprising:
determining one or more processes of the AV are utilizing the current limited visibility map; and
determining the one or more processors of the AV have ceased utilizing the current limited visibility map, wherein the applying the inconsistent portion of the update to the map is in response to both the determining that the inconsistent portion of the update is outside of the second geographical area defined in the next limited visibility map and the determining the one or more processes of the AV have ceased utilizing the current limited visibility map.

9. The tangible, non-transitory computer readable medium of claim 8, wherein the one or more processes are associated with a sensors service and a navigation service.

10. The tangible, non-transitory computer readable medium of claim 7, wherein the at least one processor performs operations further comprising:
receiving a plurality of updates, including the update to the map, wherein each of the plurality of updates is associated with a particular version of the map; and
queuing the plurality of updates.

11. The tangible, non-transitory computer readable medium of claim 7, wherein the current limited visibility map includes
a subset of the raw map data having lidar sensor data representing an environment of the first geographical area.

12. The tangible, non-transitory computer readable medium of claim 11, wherein expanding the first geographical area defined in the current limited visibility map further includes:
extending the subset of raw map data to include at least a portion of the raw map data that represents the boundary area associated with the semantic map feature that extends outside of the first geographical area, and the semantic map feature comprises at least one of a lane, a lane boundary, or drivable or undrivable areas.

13. A computing system comprising:
a communications unit;

a storage unit storing instructions; and at least one processor coupled to the communications unit and the storage unit, the at least one processor being configured to execute the instructions to:
- receive an update to a map used by an autonomous vehicle (AV), the map including raw map data overlaid with semantic map features;
- determine an inconsistent portion of the update, the inconsistent portion of the update being inconsistent with a portion of the map;
- determine a current limited visibility map defining a first geographical area within a predetermined distance from a body of the AV as the AV is navigating a route, the current limited visibility map being a subset of the map and including a subset of the semantic map features;
- identify a semantic map feature of the subset of semantic map features that extends outside of the first geographical area, the semantic map feature having a boundary area;
- expand the first geographical area defined in the current limited visibility map to include the boundary area of the identified semantic map feature;
- determine the inconsistent portion of the update and a second portion of the is within the boundary area of the expanded first geographical area defined in the current limited visibility map;
- apply a next limited visibility map, defining a second geographical area, as the AV moves out of expanded first geographical area defined in the current limited visibility map;
- determine that the inconsistent portion of the update is outside of the second geographical area defined in the next limited visibility map;
- in response to determining that the inconsistent portion of the update is outside the second geographical area, apply the inconsistent portion of the update to the map.

14. The computing system of claim 13, wherein the at least one processor is further configured to:
- determine one or more processes of the AV are utilizing the current limited visibility map; and
- determine the one or more processors of the AV have ceased utilizing the current limited visibility map, wherein the applying the inconsistent portion of the update to the map is in response to both the determining that the inconsistent portion of the update is outside of the second geographical area defined in the next limited visibility map and the determining the one or more processes of the AV have ceased utilizing the current limited visibility map.

15. The computing system of claim 14, wherein the one or more processes are associated with a sensors service and a navigation service.

16. The computing system of claim 13, wherein the at least one processor is further configured to:
- receive a plurality of updates, including the update to the map, wherein each of the plurality of updates is associated with a particular version of the map; and
- queuing the plurality of updates.

17. The computing system of claim 13, wherein the current limited visibility map includes a subset of the raw map data having lidar sensor data representing an environment of the first geographical area, and the at least one processor is further configured to:
- extend the subset of raw map data to include at least a portion of the raw map data that represents the boundary area associated with the semantic map feature that extends outside of the first geographical area, and the semantic map feature comprises at least one of a lane, a lane boundary, or drivable or undrivable areas.

* * * * *